June 9, 1925.  1,540,941
A. J. KRAUSE
ROTARY VALVE FOR GAS ENGINES
Filed Aug. 19, 1924   2 Sheets-Sheet 1

WITNESS
Chr. Nielsen

INVENTOR
Arthur J. Krause,
BY
ATTORNEYS

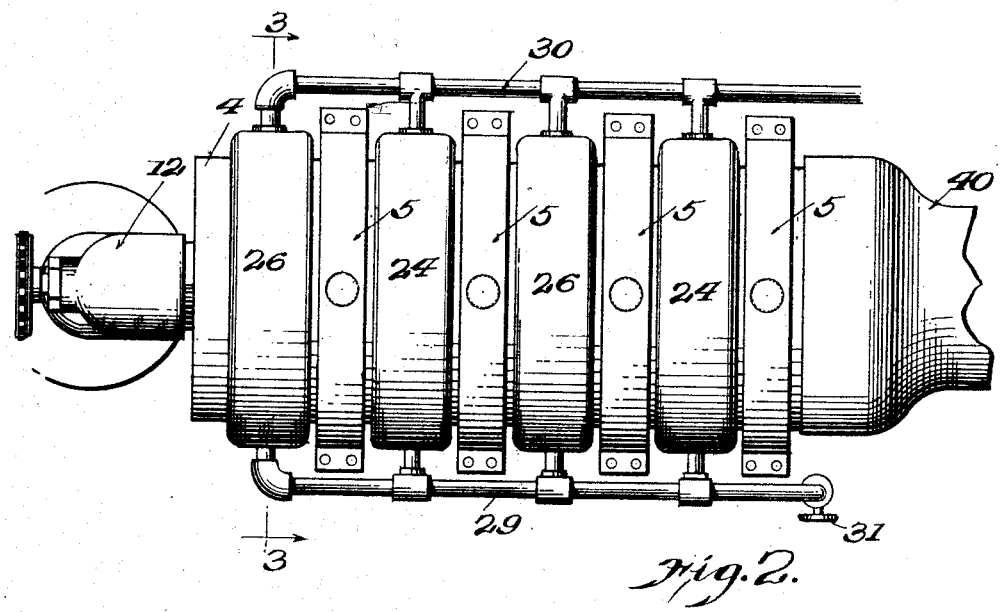
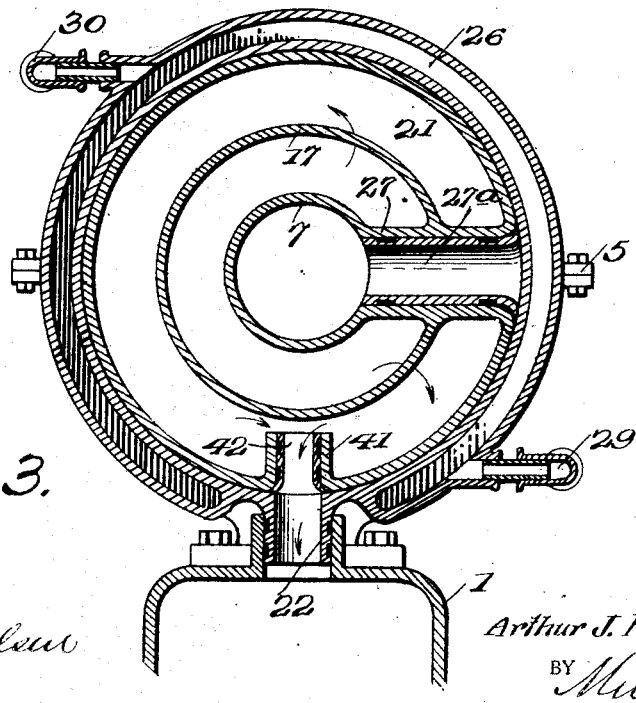

Patented June 9, 1925.

1,540,941

UNITED STATES PATENT OFFICE.

ARTHUR JOSEPH KRAUSE, OF CLEVELAND, OHIO.

ROTARY VALVE FOR GAS ENGINES.

Application filed August 19, 1924. Serial No. 732,999.

*To all whom it may concern:*

Be it known that I, ARTHUR JOSEPH KRAUSE, a citizen of the United States, and a resident of Cleveland, in the county of Cuyahoga and State of Ohio, have invented certain new and useful Improvements in Rotary Valves for Gas Engines, of which the following is a specification.

This invention relates to rotary valves and has for its object the provision of a rotatable member having a tortuous path for the combustible mixture whereby said mixture will come in contact with the heated walls of exhaust passages for thoroughly vaporizing all condensed particles of the mixture which is supplied to the engine.

A further object of the invention is the provision of the rotary valve having passages for the intake of the mixture and passages for the exhaust of the burnt gases and individual water jackets interposed between individual ball bearings for rotatably supporting the valve.

A further object of the invention is the provision of a rotary valve which may be readily applied to an internal combustion engine or removed with little or no effort.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claims.

In the drawings:

Figure 2 is a plan view of the rotary valve construction.

Figure 3 is a vertical transverse section taken along the line 3—3 of Figure 2.

Figure 1:
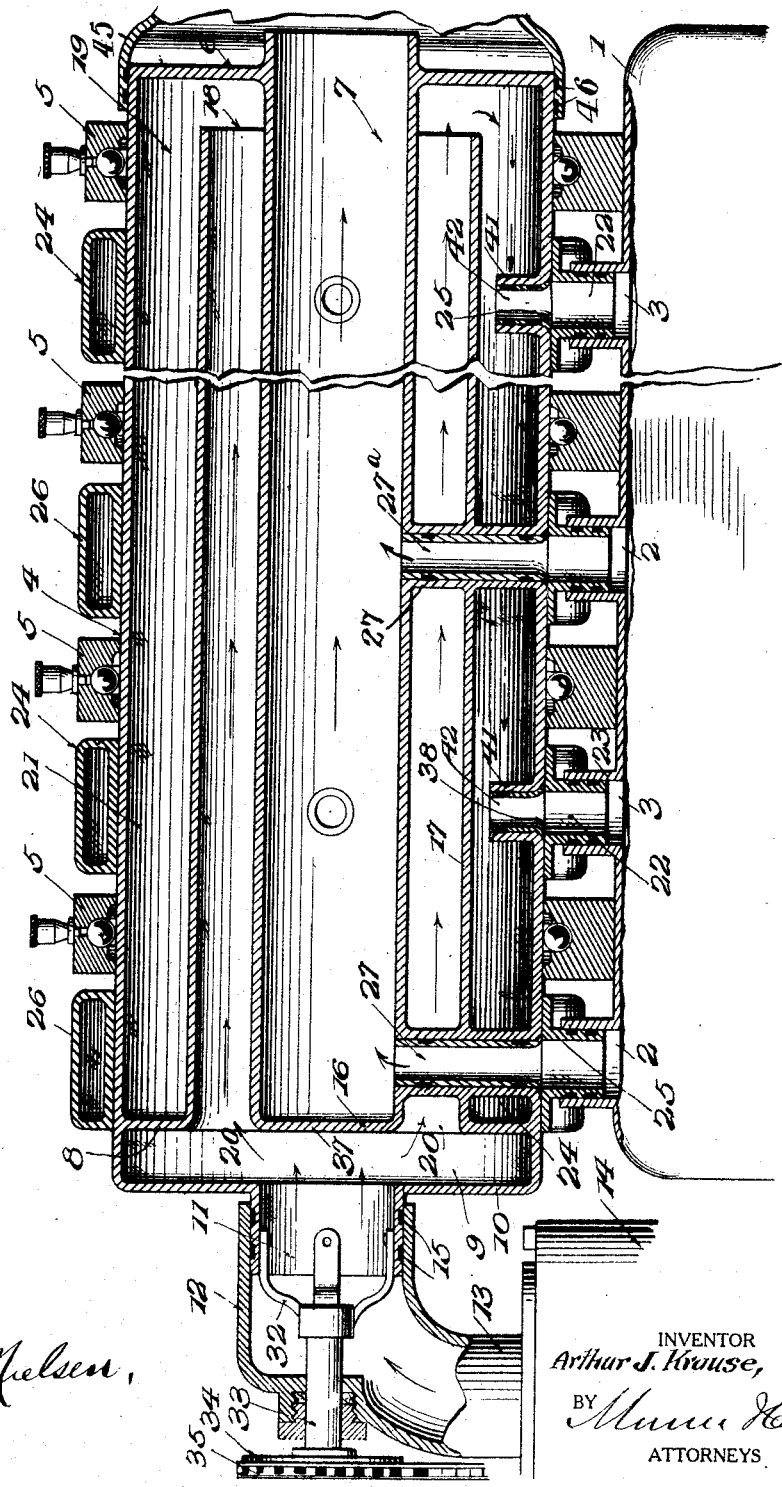
Figure 1 is a longitudinal vertical section of a rotary valve constructed according to my invention.

Referring more particularly to the drawings, 1 designates a cylinder block of an internal combustion engine including a plurality of cylinders which have exhaust ports 2 relating to the rotary valve about to be described, and intake ports 3 connecting said valve with the cylinder.

The valve is cylindrical in shape and comprises an outer cylindrical casing 4 adapted to rotate in roller bearings 5 carried by the cylinder block 1. The cylindrical casing is closed at its end by a circular member 6 which has a central opening. At the periphery of the opening is located a centrally disposed exhaust pipe 7. The exhaust pipe is formed integrally with the cylindrical member 4, the end member 6 and the inner end member 8. The inner extreme end of the cylinder 4 has an extension forming a chamber 9 which is closed by an end member 10. This end member has an integrally formed reduced extension 11 forming a portion of the intake conduit which is revolubly mounted within the circular end 12 of an intake pipe 13. This intake pipe is connected with a carburetor 14 for supplying the usual combustible mixture to the engine. The cylindrical conduit 11 is provided with annular grooves to receive the packing rings 15 which prevent the loss of fluid at this point. The inner end of the exhaust pipe 7 is closed as shown at 16.

A second cylindrical member 17 telescopes the exhaust pipe 7 and has its outer end 18 open to the chamber 19 of the cylindrical casing 4 while the inner end is open through an annular passage 20 formed between the exhaust pipe 7 and the cylindrical member 17. The portion of the chamber within the cylindrical casing 4 that is shown at 21 and which is concentric with the member 17 and the member 7 is adapted to receive combustible mixture issuing from the outer end 18 of the tubular member 17.

The concentric space 21 of the casing 4 is in communication, through the passage 22, with an intake port 3 of the engine. This passage or nipple 22 is received within a nipple 23 alining with the intake port 3, with the nipple 22 being formed integrally with a circular casting 24 forming an individual water jacket which is spaced alternately with the ball bearings 5. The passage 22 does not communicate with the water chamber within the casting 24 but is formed through the same and independent of the water jacket.

A nipple 25 which is formed integrally through the casting 26 forms another individual water jacket which is provided with a passage in communication with the exhaust port 2, with the passage in the nipple extending entirely through the casting of the water jacket 26 and out of communication with the same, the passage in the nipple being in communication with a passage 27 which communicates with the exhaust pipe 7 located centrally of the casing 4.

The alternately disposed water jackets 24 and 26 are connected with an inlet pipe 29 and an outlet pipe 30 at a point on the opposite side of the water jacket and at a point higher than the inlet. A valve 31 controls the inflow of the cooling medium.

Rigidly connected with the tubular member 11 is a yoke 32 which is rigidly connected with the inner wall of the tubular member 11 and a counter shaft 33. This counter shaft is operated through a sprocket 34 and a chain 35, the chain being entrained over a sprocket which is operatively connected with some moving part of the engine.

When the engine is operating the combustible mixture is drawn through an intake pipe 13 from the carbureter through the passage 11 and into the chamber 9. From the chamber 9 it passes through the tubular member 17, around the exhaust conduit 7 with the combustible mixture when entering the chamber 9 striking the hot end 37 of the exhaust passage 7 and being spread outwardly enters the conduit 17 and issues at the outer end 18 whence it enters the chamber 21 and through either of the passages 22 to the intake ports 3 whenever the port 38 in the wall of the rotary valve registers with passage 22. The exhaust gases pass through one of the passages 25, through the passage 27 into the centrally located exhaust conduit 7 and the gases are exhausted whenever the passage 27 registers with an exhaust port 2 in the engine cylinder.

As shown in Figures 1 and 3, the passages 38 are lined with sleeves 42 which carry packing strips for engaging the walls of the passage. The outer ends of the sleeves are flanged to engage over the ports, the flanged ends 48 being located between the inner wall of the individual water jackets and the outer wall of the valve casing adjacent the ports. It will be noted that the passages 27 are also lined with sleeves 27ª which also are flanged at their outer ends as shown at 48ª to engage around the metal of the casing at the ports for locking the sleeves against inward movement.

The outer end of the cylindrical casing 4 is received within a circular member 45 which is isolated from the chamber 19 of said outer casing but in open communication with the exhaust conduit 7 arranged centrally of the outer casing so that the exhaust gases are discharged directly into the member 45 and thence to a muffler or to the atmosphere. The outer wall adjacent the outer end of the cylindrical casing 4 is provided with grooves in which packing rings 46 are mounted for sealing the connection between the cylinder 4 and the member 45 and where the said end of the cylinder revolves in the member 45.

It will be noted that the area of the bearing surface of the outer wall of the cylinder 4 is limited due to the fact that individual roller bearings 5 are located between the various water jackets 24, and 26 and the water jackets themselves, while limited with respect to the bearing surface which engages the cylinder 4, are sufficiently extensive to cool the cylinder and maintain the valve at a proper temperature for rotation in its bearings.

What I claim is:

1. In an internal combustion engine, a rotary valve comprising a cylindrical casing provided with internally arranged exhaust and intake conduits, intake and exhaust ports, and passages connecting the intake ports and exhaust ports respectively with the intake and exhaust conduits, individual water jackets mounted on the cylindrical valve casing and provided with radial passages therethrough isolated from the water jackets, the passages in certain of the water jackets adapted to aline periodically with the intake ports of the valve, the passages in the other jackets adapted to periodically aline with the exhaust ports of the valve.

2. In an internal combustion engine, a rotary valve comprising a cylindrical casing provided with internally arranged exhaust and intake conduits, intake and exhaust ports, and passages connecting the intake ports and exhaust ports respectively with the intake and exhaust conduits, circular individual water jackets embracing the cylindrical valve casing and provided with passages therethrough isolated from the water jackets, the passage in certain of the water jackets adapted to aline periodically with the intake ports of the valve, the passages in the other jackets adapted to periodically aline with the exhaust ports of the valve.

3. In an internal combustion engine, a rotary valve comprising a cylindrical casing provided with internally arranged exhaust and intake conduits, intake and exhaust ports, and passages connecting the intake ports and exhaust ports respectively with the intake and exhaust conduits, circular individual water jackets embracing the cylindrical valve casing and provided with passages therethrough isolated from the water jackets, the passages in certain of the water jackets adapted to aline periodically with the intake ports of the valve, the passages in the other jackets adapted to periodically aline with the exhaust ports of the valve, said water jackets being spaced from each other, and ball bearings located between the water jackets and supporting the cylindrical casing.

4. In an internal combustion engine, a rotary valve comprising a cylindrical casing having its opposite ends closed, a tubular member centrally disposed in the casing forming an exhaust conduit, one end of said conduit being closed, the other end being open and extended through the closed end of the cylindrical casing, the other end of the cylindrical casing being provided with an opening for the admission of a combustible mixture, a second tubular member receiving the first tubular member and located concentrically within the cylindrical casing, one end of the second tubular member being spaced from the end of the casing provided with the intake opening and provided with an annular flange connecting said end to the inner side walls of the cylindrical casing, the other end of the said tubular member terminating short of the adjacent closed end of the cylindrical casing, said cylindrical casing being provided with ports, conduits connecting certain of the ports with the centrally disposed exhaust conduit, the other ports being connected directly with the space between the cylindrical casing and the second tubular member.

5. In an internal combustion engine, a rotary valve comprising a cylindrical casing having its opposite ends closed, a tubular member centrally disposed in the casing forming an exhaust conduit, one end of said conduit being closed, the other end being open and extended through the closed end of the cylindrical casing, the other end of the cylindrical casing being provided with an opening for the admission of a combustible mixture, a second tubular member receiving the first tubular member and located concentrically within the cylindrical casing, one end of the second tubular member being spaced from the end of the casing provided with the intake opening and provided with an annular flange connecting said end to the inner side walls of the cylindrical casing, the other end of the said tubular member terminating short of the adjacent closed end of the cylindrical casing, said cylindrical casing being provided with ports, conduits connecting certain of the ports with the centrally disposed exhaust conduit, the other ports being connected directly with the space between the cylindrical casing and the second tubular member, the end of the cylindrical casing at the intake opening for the combustible mixture being provided with a tubular bearing member, and means engaged with said last mentioned member for rotating the valves.

6. In an internal combustion engine, a rotary valve comprising a cylindrical casing provided with internally arranged exhaust and intake conduits, intake and exhaust ports and passages connecting the intake ports and exhaust ports respectively with the intake and exhaust conduits, individual water jackets mounted on the cylindrical valve casing and provided with radial passages therethrough isolated from the water jacket, the passages in certain of the water jackets adapted to aline periodically with the intake ports of the valve, the passages in the other jackets adapted to periodically aline with the exhaust ports of the valve, and sleeves lining the passages to the intake and exhaust conduits and provided with a lateral flange embracing the exhaust and intake ports to prevent inward movement of said sleeves and for sealing the passages against the loss of fluid at these points.

ARTHUR JOSEPH KRAUSE.